US012800082B2

(12) United States Patent
Wenzel et al.

(10) Patent No.: US 12,800,082 B2
(45) Date of Patent: Nov. 17, 2026

(54) FLUID COUPLING DEVICE AND METHOD FOR COUPLING TWO FLUID LINES

(71) Applicant: Illinois Tool Works Inc., Glenview, IL (US)

(72) Inventors: Daniel Wenzel, Wipperfürth (DE); Torsten Hauk, Neustadt (DE); Nils Nachtigall, Walsrode (DE); Jan Ludewig, Lindwedel (DE)

(73) Assignee: Illinois Tool Works Inc., Glenview, IL (US)

( * ) Notice: Subject to any disclaimer, the term of this patent is extended or adjusted under 35 U.S.C. 154(b) by 20 days.

(21) Appl. No.: 18/529,114

(22) Filed: Dec. 5, 2023

(65) Prior Publication Data

US 2024/0183476 A1 Jun. 6, 2024

(30) Foreign Application Priority Data

Dec. 6, 2022 (DE) ..................... 10 2022 132 410.9
Dec. 6, 2022 (DE) ..................... 10 2022 132 411.7
Nov. 28, 2023 (DE) ..................... 10 2023 133 217.1

(51) Int. Cl.
*F16L 37/12* (2006.01)

(52) U.S. Cl.
CPC ....... *F16L 37/1225* (2013.01); *F16L 2201/10* (2013.01)

(58) Field of Classification Search
CPC ... F16L 37/1225; F16L 37/123; F16L 37/127; F16L 37/138; F16L 37/144; F16L 37/148; F16L 37/142; F16L 37/15; F16L 37/16; F16L 37/1205; F16L 2201/10
See application file for complete search history.

(56) References Cited

U.S. PATENT DOCUMENTS

| | | | | |
|---|---|---|---|---|
| 7,344,166 B2 | 3/2008 | Ketcham | | |
| 7,494,156 B2 | 2/2009 | Okada | | |
| 7,497,477 B2 | 3/2009 | Pepe | | |
| 10,612,707 B2 | 4/2020 | Gocha | | |
| 11,796,099 B2 * | 10/2023 | Gocha | ................. | F16L 37/0885 |
| 2020/0056730 A1 * | 2/2020 | Kimura | ............... | F16L 37/1205 |
| 2021/0054957 A1 * | 2/2021 | Gocha | ................. | F16L 37/0885 |
| 2022/0221091 A1 * | 7/2022 | Price | ....................... | F16L 23/10 |

* cited by examiner

*Primary Examiner* — Aaron M Dunwoody
(74) *Attorney, Agent, or Firm* — McAndrews, Held & Malloy, Ltd.

(57) ABSTRACT

Provided is a fluid coupling apparatus for coupling two fluid lines. The fluid coupling apparatus includes a tubular socket element, a tubular plug element, and a retaining element. The tubular socket element has a conduction side and a coupling side. A locking sleeve is axially displaceable in the direction of the conduction side is arranged in the socket element and fixes a pre-assembly position. The tubular plug element has a conduction side and a coupling side and a retaining groove. The retaining element is biased in the pre-assembly position and can be arranged orthogonally to the axial direction and releasable by displacing the locking sleeve in the direction of the conduction side of the socket element such that the retaining element is received in the final assembly position in the retaining groove and thereby a complete coupling of the socket element and the plug element is fixed in the final assembly position.

18 Claims, 11 Drawing Sheets

FLUID COUPLING DEVICE AND METHOD FOR COUPLING TWO FLUID LINES

RELATED APPLICATIONS

The present application claims the benefit of German Patent Application No. 10 2022 132 411.7, filed Dec. 6, 2022, German Patent Application No. 10 2022 132 410.9, filed Dec. 6, 2022, and German Patent Application No. 10 2023 133 217.1, filed Nov. 28, 2023, each titled "Fluid Coupling Device and Method for Coupling Two Fluid Lines," the contents of which are hereby incorporated by reference.

BACKGROUND

Connector assemblies allow for convenient, quick, fluid-tight connections between two or more pipes, tubes, or similar components. Such connectors are commonly used in the automotive industry to connect tubing used in engine cooling line connections, fuel and brake connections, vapor connections or, more recently, in cooling circuits used to cool batteries of electric or hybrid vehicles.

U.S. Patent Publication No. 2022/026002 A1 describes a quick connector adapted to display a code that verifies that a latch member is engaged to retain an installed pipe to the quick connector.

U.S. Pat. No. 10,612,707 describes a quick connect assembly for releasably engaging an endform including a tubular stem, a collar member and a retaining member.

U.S. Pat. No. 7,497,477 describes a quick connector coupling comprising a hollow female connector body, a male member having an enlarged annular upset received in the connector body, and a retainer releasably securing the male member in the connector body U.S. Pat. Nos. 7,494,156 and 7,344,166 describe quick connectors that include a connector body, a retainer, and a complete connection indicating member capable of being repeatedly used.

Despite various advancements to date, it would nevertheless be desirable to provide a fluid coupling apparatus and a method for coupling two fluid lines.

SUMMARY

The present disclosure relates generally to a fluid coupling and associated method, substantially as illustrated by and described in connection with at least one of the figures, as set forth more completely in the claims. More specifically, to a fluid coupling apparatus and a method for coupling two fluid lines.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
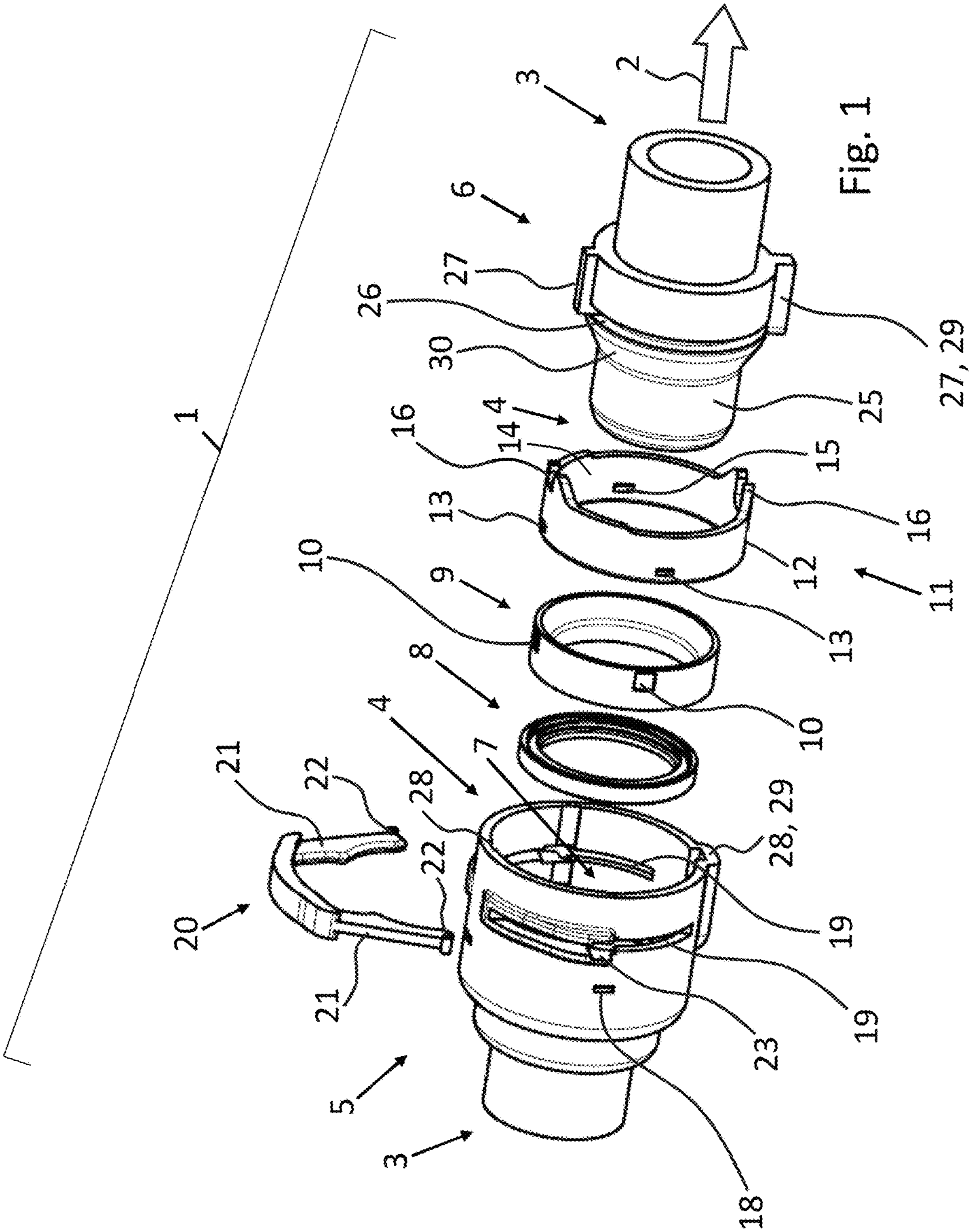
FIG. 1 illustrates a perspective exploded illustration of a fluid coupling apparatus according to the disclosure according to a first exemplary embodiment.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The present disclosure addresses the problem of providing a fluid coupling apparatus as well as a method for coupling two fluid lines, with which a final assembly position can be reliably ensured or fixed and with which a complete coupling of the fluid coupling apparatus can be detected. A further problem addressed by the present disclosure is to provide a fluid coupling apparatus that is an alternative to known fluid coupling apparatuses. A further problem addressed by the present disclosure is to provide a fluid coupling apparatus that is safe and reliable in operation. One or more of these problems are solved by the features of the independent claims 1 and 9. Advantageous configurations are specified in the respective dependent subclaims.

According to a first aspect of the present disclosure, there is provided a fluid coupling apparatus for coupling two fluid lines. It comprises: a tubular socket element having a conduction side and a coupling side, wherein a locking sleeve which is axially displaceable in the direction of the conduction side is arranged in the socket element and fixes a pre-assembly position, a tubular plug element having a conduction side and a coupling side and a retaining groove, and a retaining element biased in the pre-assembly position and preferably arranged orthogonally to the axial direction and releasable by displacing the locking sleeve in the direction of the conduction side of the socket element such that the retaining element is received in the final assembly position in the retaining groove and thereby a complete coupling of the socket element and the plug element is fixed in the final assembly position.

In the fluid coupling apparatus according to the disclosure, it is thus provided that the retaining element is biased in the pre-assembly position so that a complete coupling of the socket element and the plug element in the final assembly position can be achieved in a simple manner by means of a displacement of the locking sleeve by means of the plug element.

By receiving the retaining element in the retaining groove, it can be easily determined whether the plug element and the socket element are fully connected to one another by optical detection of the position of the retaining element.

In this way, the apparatus according to the disclosure is extremely easy to handle and also provides an alternative to fluid coupling apparatuses known from the prior art.

Furthermore, it is preferably provided that at least one retaining recess can be formed in the tubular socket element, wherein the socket element can comprise at least one locking recess, and wherein the locking sleeve can comprise at least one inner catching element for fixing the pre-assembly position, which extends radially inward and can be arranged in the locking recess in the pre-assembly position, and at least one outer catching element for fixing the locking sleeve in a final assembly position, which extends radially outward, wherein the outer catching element is arranged in the locking recess in the final assembly position, wherein two retaining element slots extending orthogonally to an axial direction and arranged opposite one another are formed in the socket element, and wherein on the tubular plug element on the outside, a retaining groove can be formed extending orthogonally to the axial direction, in which, in a final assembly position, retaining arms of the retaining element can be receivable, and wherein the retaining element can be C-shaped and can have two retaining arms, which are arranged in the retaining slots, wherein, in the pre-assembly position, the retaining arms can abut an outer casing wall of the locking sleeve in a biased manner, and wherein the retaining arms can be received in the locking groove in the final assembly position after release by the locking sleeve and can thereby fix a complete coupling of the socket element and the plug element in the final assembly position.

According to the present disclosure, it is thus provided that the retaining arms of the retaining element abut the locking sleeve while biased in the pre-assembly position. This position of the pre-assembly position is securely and reliably fixed by the inner catching elements extending radially inwardly, which are received in corresponding recesses of the socket element.

In this way, even when the fluid coupling apparatus is transported or when touched by a user, there is no displacement of individual components of the fluid coupling apparatus, so that the fluid coupling apparatus can always be used in the same pre-assembly position. In this way, a transport safety is also established.

By a relative movement between the socket element and the plug element, the inner catching elements are moved out of the corresponding locking recesses of the socket element such that the locking sleeve is displaceable in the socket element of the conduction side.

When the final assembly position is achieved, the outer catching elements of the locking sleeve lock into the retaining recesses of the socket element such that the locking sleeve is fixed in the final assembly position.

Upon achieving the final assembly position of the locking sleeve, the retaining element is released and locked automatically in the locking groove of the plug element without a further assembly step being necessary.

In this way, the final assembly position, and a complete coupling of the plug element and the socket element, is fixed in the final assembly position.

The fluid coupling apparatus is preferably thus configured such that the retaining element or the holding clip can only be locked when the socket element is fully connected to the plug element and thus all parts of the fluid coupling apparatus are in the correct position. The holding clip is therefore blocked in its open position if the locking sleeve or the lock indicator ring is not moved by an anti-rotation feature on the male counterpart. When the retaining ring is in its final position or the final assembly position, it unlocks or releases the holding clip, which then clicks into the groove of the male counterpart or plug element in order to fix the fluid coupling. If the holding clip is not released by the lock indicator ring, the holding clip remains in the open position and does not contribute to increasing the insertion force in order to facilitate assembly.

According to another embodiment of this exemplary embodiment, In addition, the retaining element or holding clip is configured such that a loss (e.g. during transport, storage, handling) is safely and reliably avoided. This will be described in detail below.

Only a translatory movement is required in order to assemble the retaining element. A tool such as a screwdriver can be used for disassembly.

The retaining element can be C-shaped and clip-like in design. Preferably, the retaining element or C-shaped retaining clip is made from a metallic material or from a plastic.

The lock indicator ring can activate a mechanism (e.g. an electronic RFID transponder; RFID tag; RFID chip) that transmits a lock confirmation signal to a receiver (worker, computer in the production line).

This signal can be used in order to control the assembly process and to reduce errors that occur due to incorrectly mounted fluid coupling apparatuses.

A sealing element can be arranged on the conduction side in the socket element and is positionally fixed in the region of the coupling side by means of a retaining ring, wherein the at least one locking recess of the socket element can be configured in the retaining ring in order to receive an inner catching element of a locking sleeve.

The retaining ring can have a sacrificial contour, in particular a radially circumferential sacrificial contour, and can be connected to the socket element integrally, for example by ultrasonics or laser welding.

Thus, the sealing element is positionally fixed in place in the socket element.

At free ends of the retaining arms of the retaining element, anti-loss retaining elements can be arranged, which are arranged in the pre-assembly position in the anti-loss retaining recesses formed in the retaining element slots.

By way of the anti-loss retaining elements in conjunction with the anti-loss retaining recesses, the retaining element is connected to the socket element in the pre-assembly position in a loss-proof manner. In this way, the retaining element cannot be lost during transport or storage, and the fluid coupling apparatus according to the disclosure is always in the same home position or pre-assembly position for the user.

Furthermore, the fluid coupling apparatus can comprise a groove-like/spring-like anti-rotation retaining device for axially guiding a relative movement between the socket element and the plug element, wherein, on an outer casing wall of the plug element, two diametrically opposed protrusions can be molded, extending in the axial direction and in the radial direction outwardly, and wherein, on an inner casing wall of the socket element, two grooves can be formed so as to correspond to the two diametrically opposed protrusions and extending in the axial direction, in which the two diametrically opposed protrusions can be received, and wherein two anti-rotation retaining recesses can be formed in the locking sleeve on the connection side and are arranged diametrically opposite one another, in which portions of the two diametrically opposed protrusions of the plug element can be received.

The anti-rotation retaining device ensures that, when coupling two fluid lines coupled to the socket element and the plug element, an always equal orientation of the fluid lines is maintained. Thus, the socket element and plug element can be connected to one another in the axial direction by means of a translatory relative movement between the two elements.

In addition, the entire force can be transferred during the insertion process, because it only acts in the axial direction.

By coupling the locking sleeve to the anti-rotation retaining device, it is ensured that it is also only displaced in the axial direction and cannot be set into a rotational movement. This additionally reduces the insertion force and ensures that the plug element and the socket element can be reliably connected to one another.

The fluid coupling apparatus can comprise a verification device for detecting the final assembly position, wherein the verification device can comprise: an RFID tag with an RFID chip, which can be connected to an antenna in the pre-assembly position via a line section, wherein the fluid coupling apparatus can comprise means for severing the line section such that, in the final assembly position, the line section can be severed such that a verification signal for detecting the final assembly position is detectable.

Such a detection can be detected, for example, by means of a control device that determines that the RFID chip no longer produces a signal after the connection to the antenna has been severed.

Additionally and/or alternatively, an optical and/or a haptic indicator device for detecting the final assembly position can also be provided.

It is conceivable, for example, that a color marking is arranged on the plug element and a corresponding recess is provided in the socket element, so that upon achieving and fixing the final assembly position, the color marking of the plug element is visible by the recess of the socket element.

According to a similar principle, a haptic indicator device can also be provided. This can also be represented, for example, by the positioning of the retaining element. Furthermore, it can also be provided that catching means are molded onto the plug element, which, upon achieving the final assembly position, completely closes a recess formed in the socket element, so that a smooth surface can be sensed or is visible, for example, instead of the recess.

Furthermore, four radially circumferential and preferably equally distanced retaining recesses, in particular configured as passage recesses, can be arranged in the socket element, and/or two radially circumferential and preferably equally distanced locking recesses, in particular configured as a passage recess, can be arranged in the socket element, in particular in the retaining ring, and/or two radially circumferential inner catching elements extending radially inwardly can be molded onto the locking sleeve, and/or two radially circumferential outer catching elements extending radially outward can be molded onto the locking sleeve.

Instead of two radially circumferential and equally distanced catching elements and recesses, for example, three or four or five or more catching elements and corresponding recesses can also be provided.

Furthermore, according to the present disclosure, a method for axially coupling two fluid lines to a fluid coupling apparatus described above is provided. It comprises the following steps: introducing a tubular plug element in the axial direction into a tubular socket element, displacing a locking sleeve of the socket element in the direction of a conduction side of the fluid coupling apparatus by means of the plug element, and thereby disengaging at least one inner catching element of the retaining element from a locking recess with which a pre-assembly position has been fixed and locking an outer catching element in a retaining recess of the socket element, releasing a biased retaining element by the displacement of the locking sleeve, moving retaining arms of the retaining element radially inward and orthogonal to an axial direction in the direction of the socket element and the plug element, and inserting the retaining arms into a retaining groove of the plug element, and thereby fixing the socket element and the plug element in a completely coupled final assembly position.

The advantages of the method according to the disclosure correspond analogously to the advantages described above with respect to the fluid coupling apparatus according to the disclosure.

Furthermore, the method can comprise the following steps: linearly guiding a relative movement in the axial direction between the socket element, the locking sleeve of the socket element, and the plug element by means of a groove-like and spring-like anti-rotation retaining device.

According to a second aspect of the present disclosure, there is provided according to the disclosure a fluid coupling apparatus for coupling two fluid lines. It comprises: a tubular socket element having a conduction side and a coupling side, wherein a locking sleeve which is axially displaceable in the direction of the conduction side is preferably arranged in the socket element and fixes a pre-assembly position, a tubular plug element having a conduction side and a coupling side and a retaining groove, and a sleeve-like retaining element with at least one catching element, wherein, in the pre-assembly position, the catching element is preferably biased, and which is blocked by the locking sleeve, and which is releasable by displacing the locking sleeve by means of the plug element in the direction of the conduction side of the socket element, such that the retaining element is taken and received in the retaining groove in a final assembly position and thereby fixes a complete coupling of the socket element and the plug element in the final assembly position.

In the fluid coupling apparatus according to the disclosure, it is thus provided that the retaining element is biased in the pre-assembly position so that a complete coupling of the socket element and the plug element in the final assembly position can be achieved in a simple manner by means of a displacement of the locking sleeve by means of the plug element.

By receiving the retaining element in the retaining groove, it can be easily determined whether the plug element and the socket element are fully connected to one another by optical detection of the position of the retaining element.

In this way, the apparatus according to the disclosure is extremely easy to handle and also provides an alternative to fluid coupling apparatuses known from the prior art.

Furthermore, at least one axially extending inner holding groove and a locking recess can be configured in the tubular socket element, wherein the locking sleeve comprises at least one locking element extending in the axial direction for applying a radially outward acting force onto at least one catching element of the retaining element, which can be arranged in the locking recess in the pre-assembly position, and at least one holding lug, which extends radially outward and can be arranged in the holding groove, wherein at least one catching element passage opening extending orthogonal to the axial direction can be configured in the socket element, and wherein on the tubular plug element on the outside, a retaining groove can be formed extending orthogonally to the axial direction, in which, in a final assembly position, a catching edge of the catching element of the retaining element can be receivable, and wherein the retaining element can comprise at least one catching element, whose catching edge can abut against the locking element of the locking sleeve in a biased manner, preferably in the pre-assembly position, and wherein the catching edge of the catching element can be received and arranged in the retaining groove in the final assembly position after release by the locking element of the locking sleeve, and the plug element can thereby fix a complete coupling of the socket element and the plug element in the final assembly position.

According to the present disclosure, it is thus provided that the catching elements of the retaining element abut the locking sleeve while biased in the pre-assembly position. This position of the pre-assembly position is securely and reliably fixed by the inner catching elements extending radially inwardly against an outer casing wall of the locking sleeve.

In this way, even when the fluid coupling apparatus is transported or when touched by a user, there is no displacement of individual components of the fluid coupling apparatus, so that the fluid coupling apparatus can always be used in the same pre-assembly position. In this way, a transport safety is also established.

By a relative movement between the socket element and the plug element, the locking sleeve is displaced in the socket element in the direction of the of the conduction side of the socket element.

When achieving the final assembly position, the catching elements of the retaining element lock in the retaining groove of the plug element so that the locking sleeve is fixed in the final assembly position. In addition, the locking sleeve can comprise means that lock into retaining recesses of the socket element in order to fix the locking sleeve in a final assembly position.

Upon achieving the final assembly position of the locking sleeve, the retaining element is released and its catching elements are locked automatically in the locking groove of the plug element without a further assembly step being necessary.

In this way, the final assembly position, and a complete coupling of the plug element and the socket element, is fixed in the final assembly position.

Thus, the fluid coupling apparatus can be configured such that the catching elements can be engaged only when the socket element and the plug element are fully connected to one another in a final assembly position and thus all of the parts on the fluid coupling apparatus are arranged in the correct location. It can also be provided that the locking sleeve is first fixed in the final assembly position. The retaining element is blocked by the locking sleeve in its open position, and its catching elements are blocked. When the locking sleeve or the lock indicator part is moved by a corresponding counterpart (geometry/contour) in the direction of the conduction side of the socket element and the final assembly position is achieved, the catching elements are released. When the lock indicator is in its final position, it unlocks the catching elements, which then lock into the retaining groove of the plug element with its catching edges in order to fix the final assembly position. As long as the catching elements of the retaining element are not unlocked by the lock indicator, the catching elements remain in the open biased position and do not contribute to increasing the insertion force in order to facilitate assembly.

Thus, only a translatory movement in the axial direction is required in order to connect the socket element and the plug element to one another.

In order to release the connection, it is merely necessary to perform a rotational movement on the retaining element.

The lock indicator ring can additionally activate a mechanism (e.g. an electronic RFID transponder) that transmits a lock confirmation signal to a receiver (worker, computer in the production line). This signal can be used in order to control the assembly process and to reduce errors that occur due to incorrectly mounted fluid ports.

In addition, the retaining element or holding clip is configured such that a loss (e.g. during transport, storage, handling) is safely and reliably avoided. This will be described in detail below.

In the socket element, a sealing element can be arranged on the conduction side, which, in the region of the coupling side, is held in a loss-proof manner by means of the locking sleeve in the pre-assembly position and positionally fixed in the final assembly position.

Two diametrically opposed and radially inwardly extending catching elements can be formed on the retaining element, with corresponding catching edges.

In the socket element, two catching element receptacles, which are conically tapered and diametrically opposite one another, can be molded in the socket element in the direction of the coupling side, wherein, in the catching element receptacles, a respective locking recess and a respective catching element passage opening can be formed on the coupling side, and wherein in particular in the socket element, two diametrically opposed holding grooves are configured, in which a respective holding body for limiting a displacement of the locking sleeve in the direction of the coupling side of the socket element is arranged.

The locking sleeve is held in a loss-proof manner in the socket element by the holding element of the locking sleeve, which is arranged in the holding body and a corresponding holding element in the holding groove, so that an anti-loss mechanism is formed.

Molded on the locking sleeve on the outer side, two diametrically opposed locking elements, two diametrically opposed holding elements, and two diametrically opposed anti-rotation retaining elements can be provided, which form an anti-rotation retaining device and an axial guiding device, respectively.

The fluid coupling apparatus can comprise a verification device for detecting the final assembly position, wherein the verification device can comprise:

An RFID tag with an RFID chip, which is connected to an antenna in the pre-assembly position via a line section, wherein the fluid coupling apparatus comprises means for severing the line section such that, in the final assembly position, the line section can be severed such that a verification signal for detecting the final assembly position is detectable.

Such a detection can be detected, for example, by means of a control device that determines that the RFID chip no longer produces a signal after the connection to the antenna has been severed.

Additionally and/or alternatively, an optical and/or a haptic indicator device for detecting the final assembly position can also be provided.

It is conceivable, for example, that a color marking is arranged on the plug element and a corresponding recess is provided in the socket element, so that upon achieving and fixing the final assembly position, the color marking of the plug element is visible by the recess of the socket element.

According to a similar principle, a haptic indicator device can also be provided. This can also be represented, for example, by the positioning of the retaining element. Furthermore, it can also be provided that catching means are molded onto the plug element, which, upon achieving the final assembly position, completely closes a recess formed in the socket element, so that a smooth surface can be sensed or is visible, for example, instead of the recess.

On the socket element, threaded section-like disassembly grooves can be formed adjacent to the catching element receptacles, such that the catching elements of the retaining element are disengaged from the retaining groove of the plug element by a rotational movement in order to release the coupling between the socket element and the plug element.

By providing corresponding disassembly grooves, by a simple rotation of the retaining element, the catching elements of the retaining element can be disengaged from the retaining groove of the plug element in order to release the coupling between the socket element and the plug element. Thus, a tool-free disassembly or a tool-free connection and a tool-free release of the connection between the socket element and the plug element is enabled.

The fluid coupling apparatus can comprise a groove-like/spring-like anti-rotation retaining device for axially guiding a relative movement between the socket element and the plug element, wherein two diametrically opposed protrusions can be molded onto an outer casing wall of the plug element and can extend in the axial direction and in the radial direction outward, and wherein, on an inner casing wall of the socket element, two grooves configured so as to correspond to the two diametrically opposed protrusions and extending in the axial direction can be formed, in which the two diametrically opposed protrusions are received, and wherein two anti-rotation retaining elements can be arranged diametrically opposite one another on an outer casing wall of the locking sleeve, which are displaceably received and guided in the axial direction in the grooves of the socket element.

The anti-rotation retaining device ensures that, when coupling two fluid lines coupled to the socket element and the plug element, an always equal orientation of the fluid lines is maintained. Thus, the socket element and plug element can be connected to one another in the axial direction by means of a translatory relative movement between the two elements.

In addition, the entire force can be transferred during the insertion process, because it only acts in the axial direction.

By coupling the locking sleeve to the anti-rotation retaining device, it is ensured that it is also only displaced in the axial direction and cannot be set into a rotational movement. This additionally reduces the insertion force and ensures that the plug element and the socket element can be reliably connected to one another.

Furthermore, according to the present disclosure, a method for axially coupling two fluid lines to a fluid coupling apparatus described above is provided. It comprises the following steps: introducing a tubular plug element in the axial direction into a tubular socket element, displacing a locking sleeve of the socket element in the direction of a conduction side of the socket element by means of the plug element, and thereby releasing at least one biased catching element of the retaining element, and thereby moving the catching element of the retaining element radially inward, and inserting a catching edge of the retaining element into a retaining groove of the plug element, and thereby fixing the socket element and the plug element in a completely coupled final assembly position, and preferably linearly guiding a relative movement in the axial direction between the socket element, the locking sleeve of the socket element, and the plug element by means of a groove-like and spring-like anti-rotation retaining device.

The technical features of the exemplary embodiment of the present disclosure described below can be combined with one another as desired, insofar as technically possible.

Figure 2:
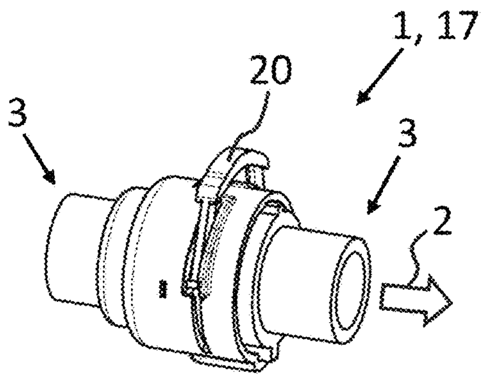
FIG. 2 illustrates a perspective illustration of the fluid coupling apparatus in a pre-assembly position.
Figure 3:
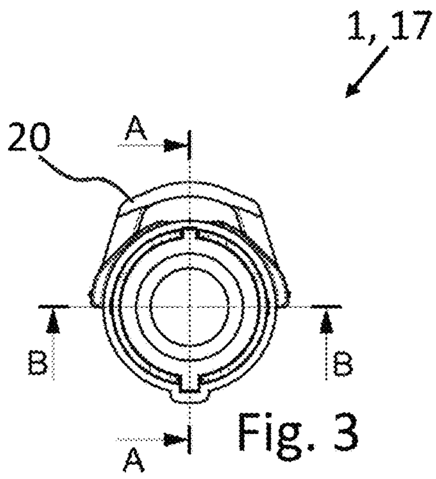
FIG. 3 illustrates an aerial view in the axial direction of the fluid coupling apparatus in the pre-assembly position.
Figure 4:
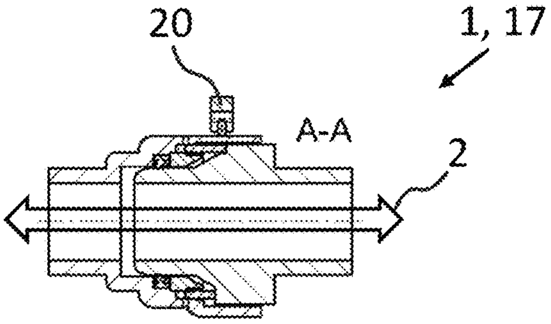
FIG. 4 illustrates a side-cut illustration of the fluid coupling apparatus, cut along line A-A in the pre-assembly position.
Figure 5:
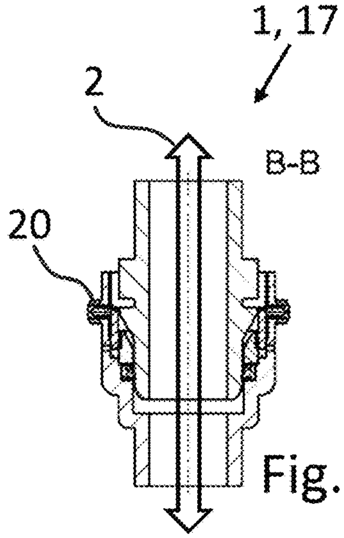
FIG. 5 illustrates a side-cut illustration of the fluid coupling apparatus, cut along line B-B in the pre-assembly position.
Figure 6:
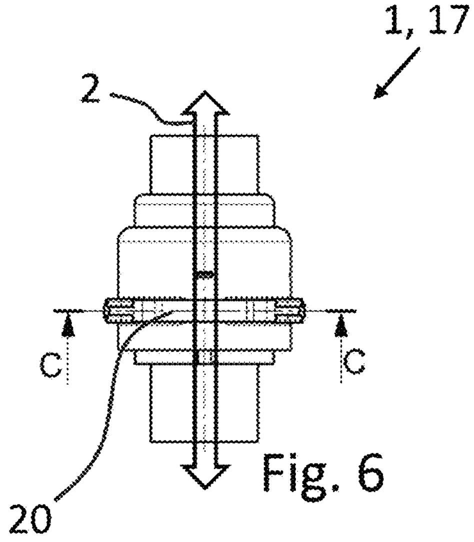
FIG. 6 illustrates a side view of the fluid coupling apparatus in the pre-assembly position.
Figure 7:
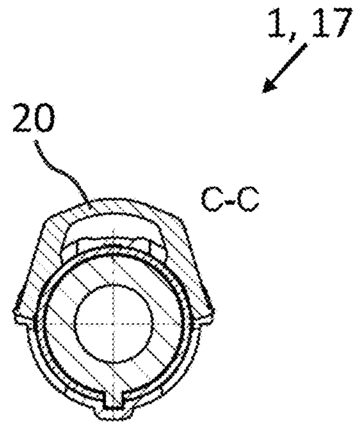
FIG. 7 illustrates a cut, cross-sectional illustration of the fluid coupling apparatus, cut along line C-C in the pre-assembly position.
Figure 8:
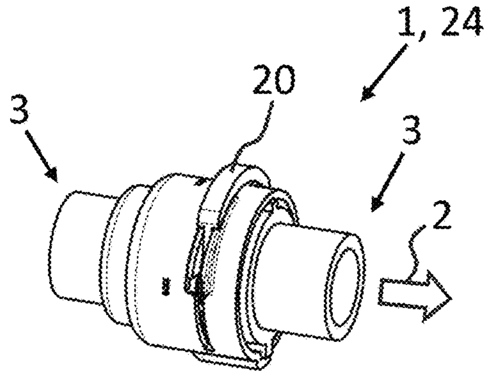
FIG. 8 illustrates a perspective illustration of the fluid coupling apparatus in a final assembly position.
Figure 9:
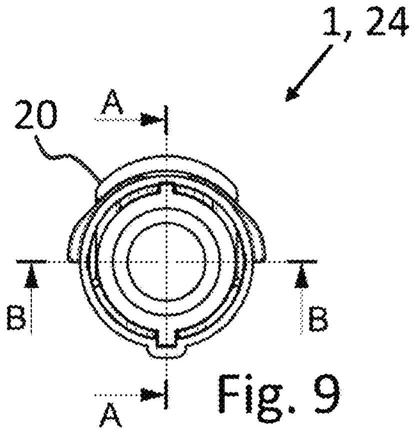
FIG. 9 illustrates an aerial view in the axial direction of the fluid coupling apparatus in the final assembly position.
Figure 10:
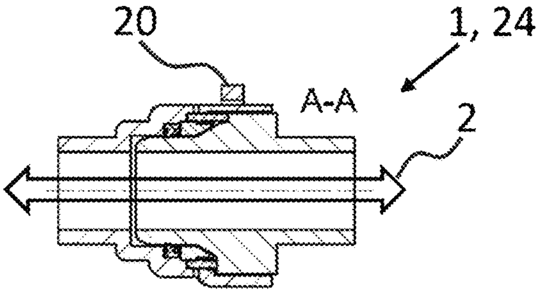
FIG. 10 illustrates a side-cut illustration of the fluid coupling apparatus, cut along line A-A in the final assembly position.
Figure 11:
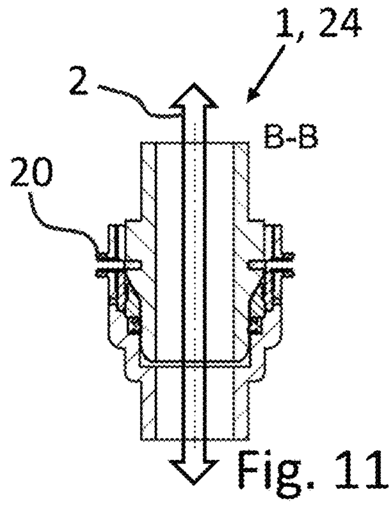
FIG. 11 illustrates a side-cut illustration of the fluid coupling apparatus, cut along line B-B in the final assembly position.
Figure 12:
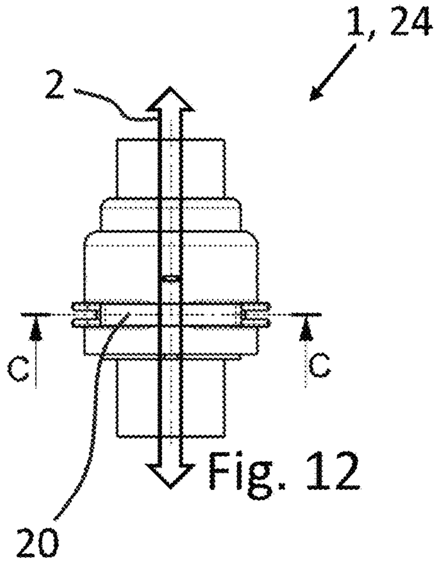
FIG. 12 illustrates a side view of the fluid coupling apparatus in the final assembly position.
Figure 13:
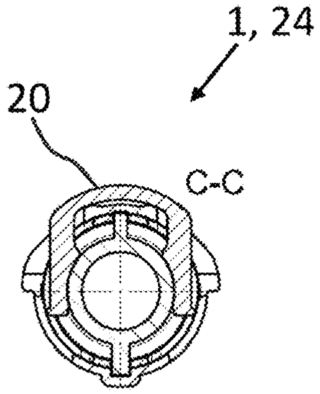
FIG. 13 illustrates a cut, cross-sectional illustration of the fluid coupling apparatus, cut along line C-C in the final assembly position.

In the following, a fluid coupling apparatus 1 according to the disclosure is described in further detail according to a first exemplary embodiment (FIGS. 1-13).

The fluid coupling apparatus 1 is provided for axially coupling two fluid lines (not shown) in an axial direction 2. Preferably, the fluid lines can be liquid lines, so that the fluid coupling apparatus is configured in particular for liquids, e.g. in coolant systems of motor vehicles.

Furthermore, the fluid coupling apparatus 1 comprises a tubular socket element 5 forming a female part and a tubular plug element 6 forming a male part.

The socket element 5 and the tubular plug element 6 of the fluid coupling apparatus 1 each have a conduction side 3 and a coupling side 4.

In the socket element 5, a receiving space 7 is configured for receiving the plug element 6.

In the receiving space 7, an annular sealing element 8 is first arranged in the axial direction 2. The sealing element 8 is positionally fixed by means of a retaining ring 9.

The retaining ring 9 is integrally connected to the socket element 5. For example, a sacrificial contour can be molded radially circumferentially onto the retaining ring 9, so that the retaining ring 9 can be connected to the socket element 5 by means of ultrasonic welding. Other suitable connecting means, such as catching connections, are also additionally or alternatively possible.

Two or four locking recesses 10 are preferably formed in the retaining ring 9 offset by 90° with respect to one another. The locking recesses 10 are preferably designed as passage openings. Three or four or more locking recesses 10 can also be provided, which then circumscribe tangentially and are arranged approximately equidistant from one another.

Furthermore, a tubular locking sleeve 11 is arranged in the socket element 5. The locking sleeve 11 is displaceable in the axial direction 2 in the direction of the conduction side 3 of the socket element 5.

Outer catching elements 13, which extend radially outward, are formed on an outer casing wall 12 of the locking sleeve 11. Two or four radially circumferential outer catching elements are also provided here. Three or four or more catching elements 13 can also be provided, which are then arranged tangentially circumferentially and approximately equidistant from one another.

Inner catching elements 15 are molded onto an inner casing wall 14 of the locking sleeve 11. Three or four or more outer catching elements 13 can also be provided, which are then arranged tangentially circumferentially and approximately equidistant from one another.

On a front-facing end portion of the locking sleeve 11, two anti-rotation retaining recesses 16, which are diametrically opposite one another, are formed on the coupling side.

The locking sleeve 11 is axially displaceably fixed in a pre-assembly position 17 via the inner catching elements 15, which are locked in the locking recesses 10 of the retaining ring 6.

Furthermore, four radially circumferential and equally distanced retaining recesses 18 are formed in the socket element 5.

Furthermore, the socket element 5 comprises two retaining element receiving slots 19 extending orthogonally to the axial direction 2.

In addition, the fluid coupling apparatus 1 comprises a retaining element 20. The retaining element 20 is approximately C-shaped and has two retaining arms 21.

The retaining element is preferably formed from metal, but can alternatively also be formed from plastic.

Anti-loss retaining elements 22 are molded onto free ends of the retaining arms 21 and are received in the pre-assembly position 17 in the anti-loss retaining recesses 23 formed in the retaining element slots 19.

In the pre-assembly position 17, the retaining arms 21 are bent and biased in the radial direction outward.

In a final assembly position 24, the outer catching elements 13 of the locking sleeve 11 lock into the retaining recesses 18 of the socket element 5.

The plug element 6 first comprises on the coupling side a cylindrical section 25 with an insertion slope, which transitions in the axial direction 2 via a conical flare into a radially circumferential retaining groove 26 of the plug element 6.

Two protrusions 27 which are diametrically opposite one another and extend radially outwards as well as in the axial direction 2 are molded in the axial direction 2 adjacent to the radially circumferential retaining groove 26.

The receiving space 7 of the socket element 5 is correspondingly configured so as to approximately correspond to the outer contour of the plug element 6 and accordingly comprises two grooves 28 which are diametrically opposed and extend in the axial direction.

The plug element 6 can also be configured without corresponding protrusions 27.

The grooves 28 of the socket element 5, in conjunction with the protrusions 27 of the plug element 6, can form an anti-rotation retaining device 29 of the fluid coupling apparatus 1.

Furthermore, according to the present disclosure, a method is provided for axially coupling two fluid lines to the fluid coupling apparatus 1 according to the present disclosure.

In the axial coupling, the socket element 5 and the plug element 6 are first moved or displaced in the axial direction relative to one another. In this way, the anti-rotation retaining recesses 16 of the locking sleeve 11 contact the protrusions 27 of the plug element 6, such that the locking sleeve 11 is displaced in the axial direction 2 in the direction of the conduction side of the socket element 5, thereby axially displacing the inner catching elements 15 of the locking sleeve 11 in the locking recesses 10 of the retaining ring 9. It can alternatively be provided that the inner catching elements 15 of the locking sleeve 11 are disengaged from the locking recesses 10 of the retaining ring 9.

Through a further displacement of the locking sleeve 11 by means of the plug element 6, the outer catching elements 13 of the locking sleeve 11 finally lock into the retaining recesses 18 of the socket element 5 so that the retaining arms 21 of the retaining element 20 now move freely through the retaining element receiving slots 19 into the receiving space 7 and engage with the radially circumferential retaining groove 26 of the plug element 6.

In this way, the final assembly position 24 is securely and reliably fixed. The retaining arms 21 or the retaining element 20 are not only moved radially inward, but also orthogonally to the axial direction 2 in the direction of the receiving space 7.

In this way, a complete coupling of the socket element 5 and the plug element 6 is possible, and the final assembly position 24 is securely and reliably fixed.

In addition, the fluid coupling apparatus 1 can comprise a verification device (not shown) for detecting the final assembly position 21.

For this purpose, in particular, an RFID tag is provided, having an RFID chip that is connected to an antenna via a line section. For example, the line section can extend in the axial direction transversely over one of the retaining element slots 16 so that the retaining element 20 or its retaining arms 21 do not touch the connection section.

The respective arm can be sharp-edged or can comprise a cutting means, for example, so that, upon the displacement of the retaining arms when achieving the final assembly position, the line section between the RFID chip and the antenna is severed.

Accordingly, the RFID chip then no longer generates a signal, and the loss of this signal can be detected by a corresponding control device in the form of a detection signal in order to verify the end assembly position.

Alternatively, the line portion can also be interrupted in the pre-assembly position, wherein, upon achieving the final assembly position, the connection is established in order to generate a signal that is detectable as a detection signal.

Addition or alternatively, haptic and/or optical verification devices are also possible.

Figure 14:
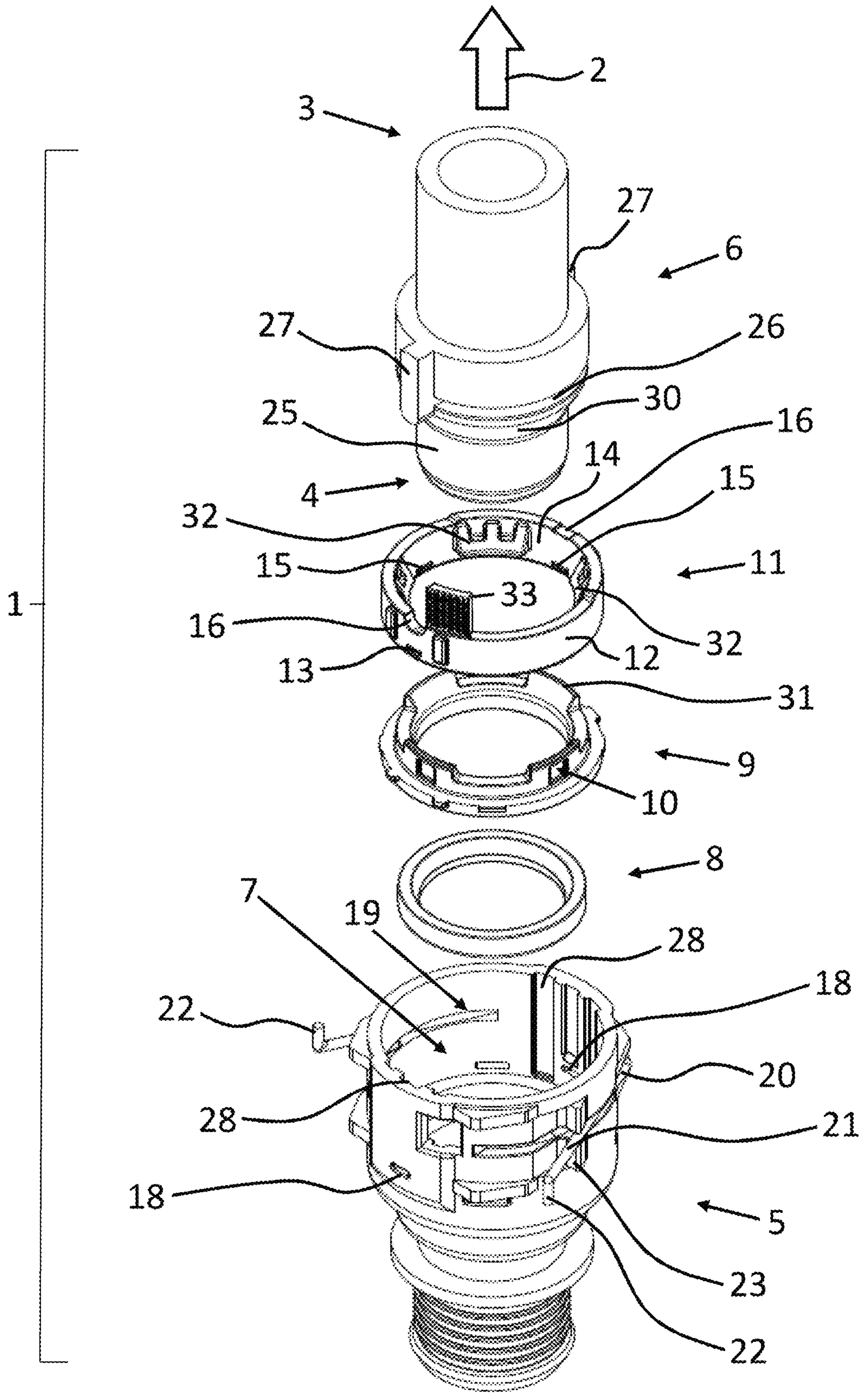
FIG. 14 illustrates a perspective exploded illustration of a fluid coupling apparatus according to the disclosure according to a second exemplary embodiment.
Figure 15:
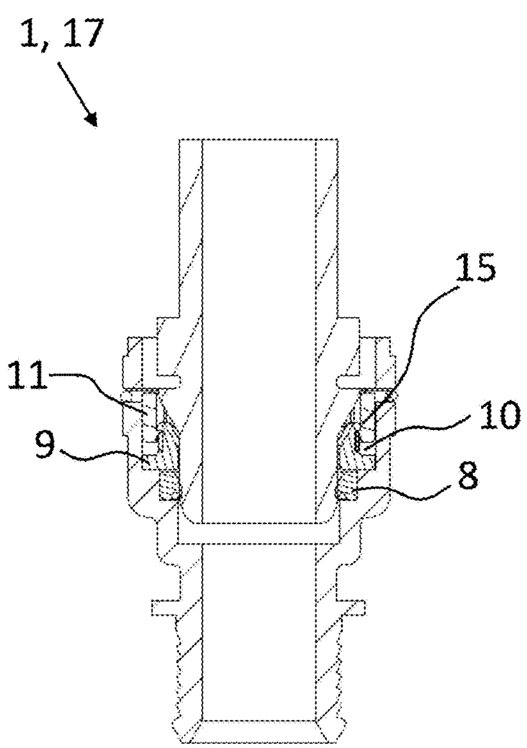
FIG. 15 illustrates a side-cut illustration of the fluid coupling apparatus in a pre-assembly position.
Figure 16:
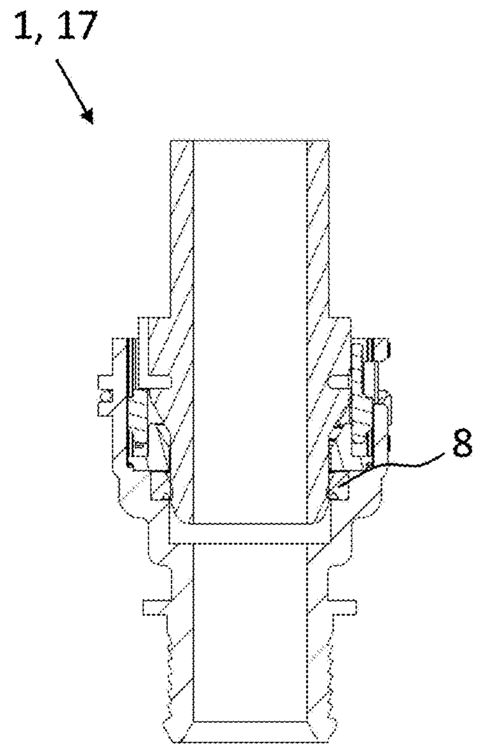
FIG. 16 illustrates a side-cut illustration of the fluid coupling apparatus in a pre-assembly position.
Figure 17:
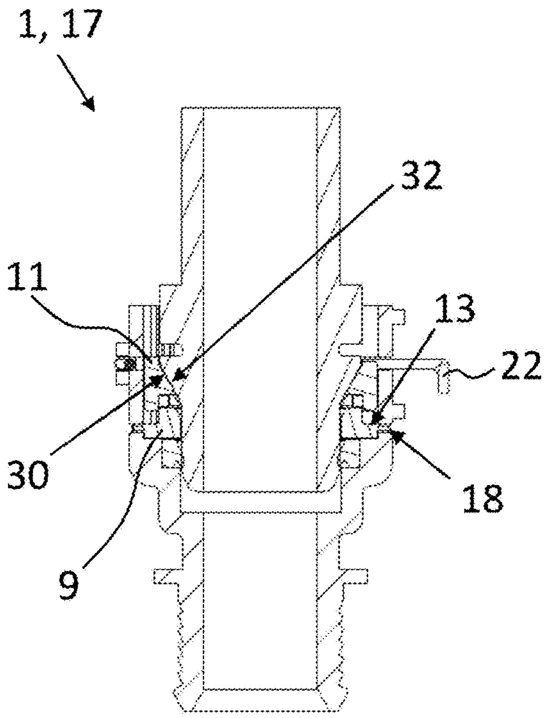
FIG. 17 illustrates a side-cut illustration of the fluid coupling apparatus in a pre-assembly position.
Figure 18:
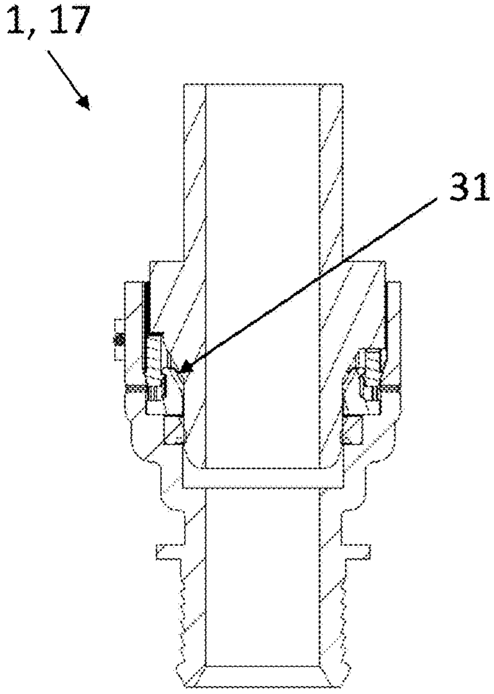
FIG. 18 illustrates a side-cut illustration of the fluid coupling apparatus in a pre-assembly position.
Figure 19:
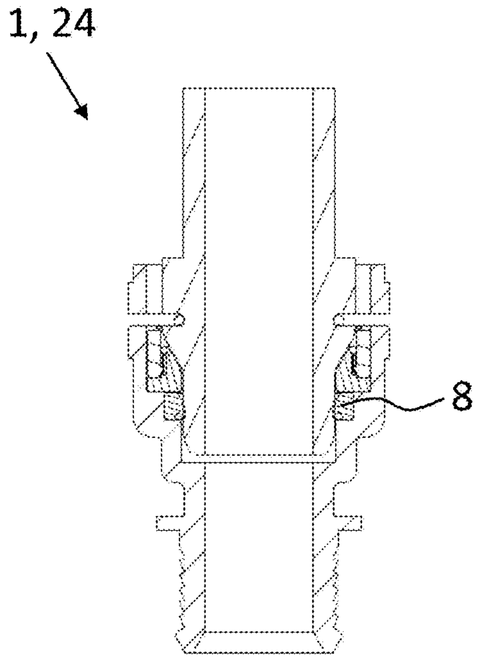
FIG. 19 illustrates a side-cut illustration of the fluid coupling apparatus in a final assembly position.
Figure 20:
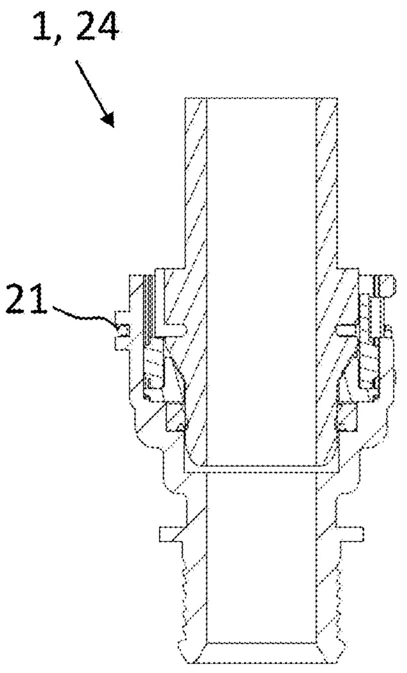
FIG. 20 illustrates a side-cut illustration of the fluid coupling apparatus in a final assembly position.
Figure 21:
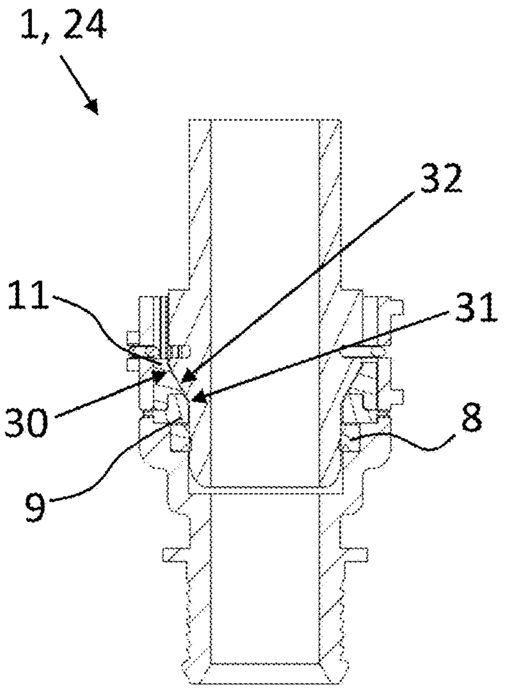
FIG. 21 illustrates a side-cut illustration of the fluid coupling apparatus in a final assembly position.
Figure 22:
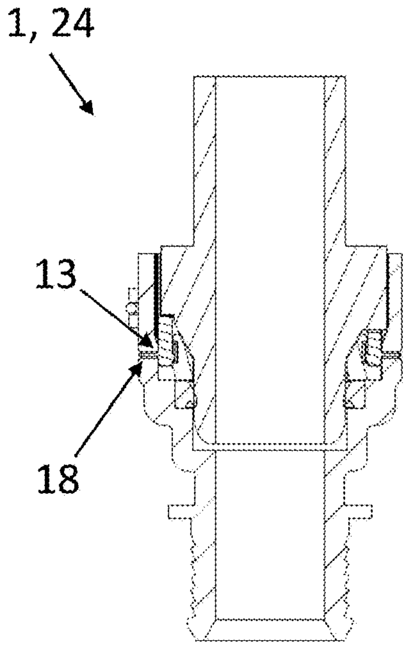
FIG. 22 illustrates a side-cut illustration of the fluid coupling apparatus in a final assembly position.
Figure 23:
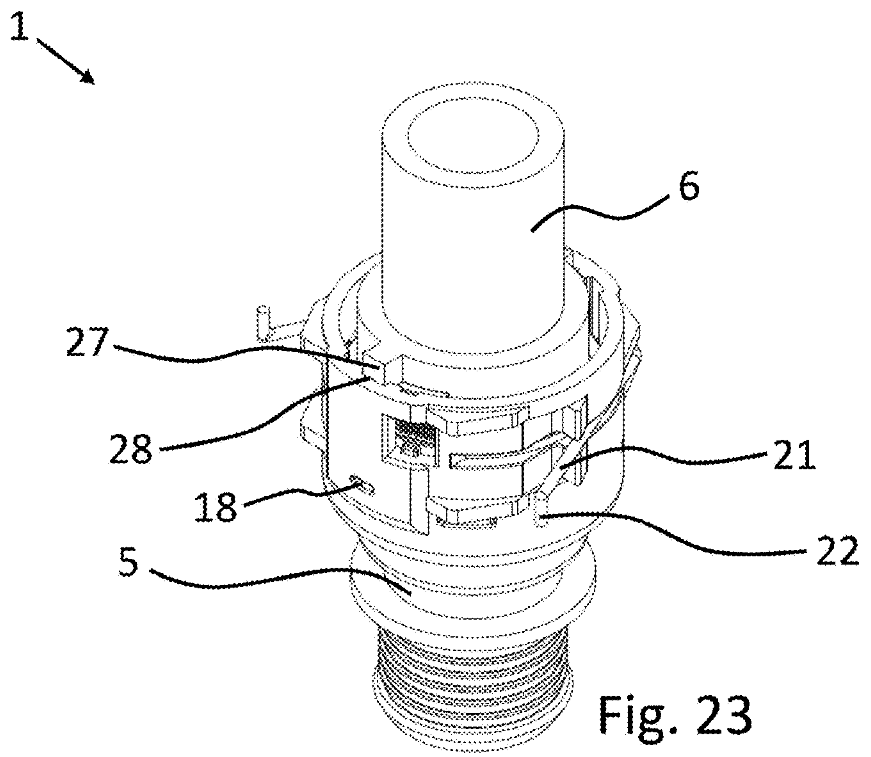
FIG. 23 illustrates a perspective illustration of the fluid coupling apparatus in a pre-assembly position.
Figure 26:
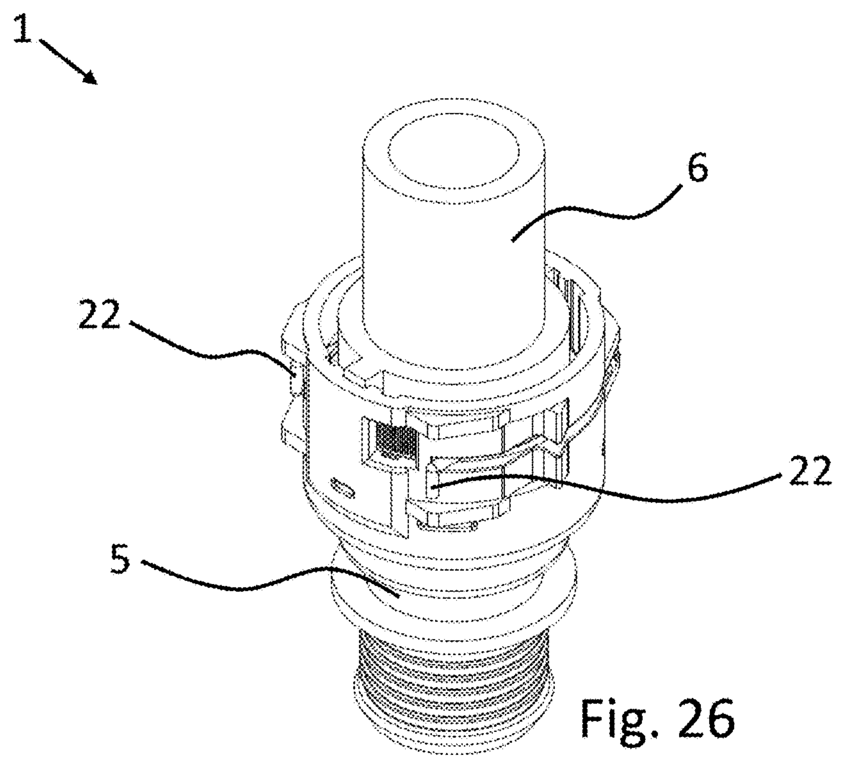
FIG. 26 illustrates a perspective illustration of the fluid coupling apparatus in a final assembly position.
Figure 24:
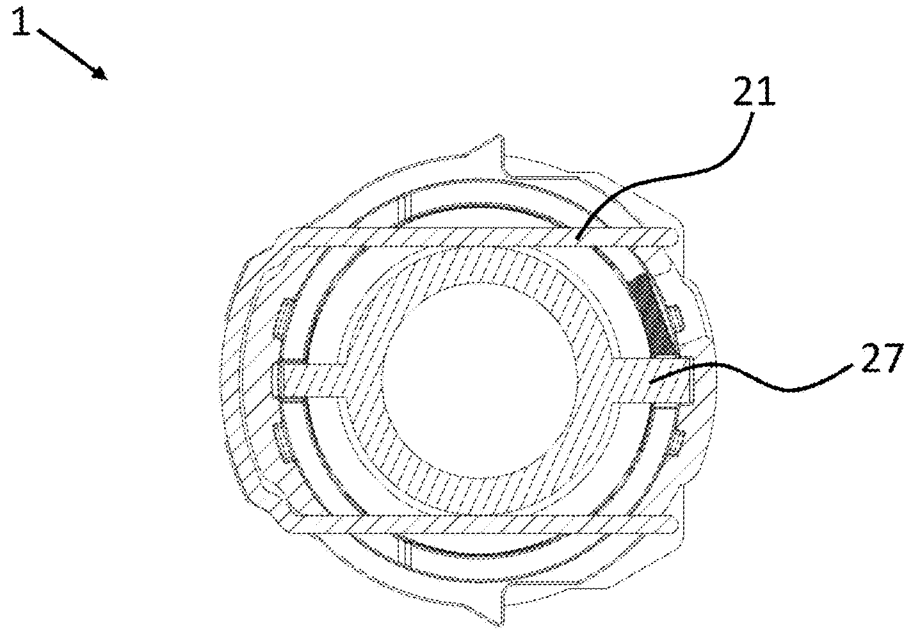
FIG. 24 illustrates a cross-section through the fluid coupling apparatus in a pre-assembly position.
Figure 25:
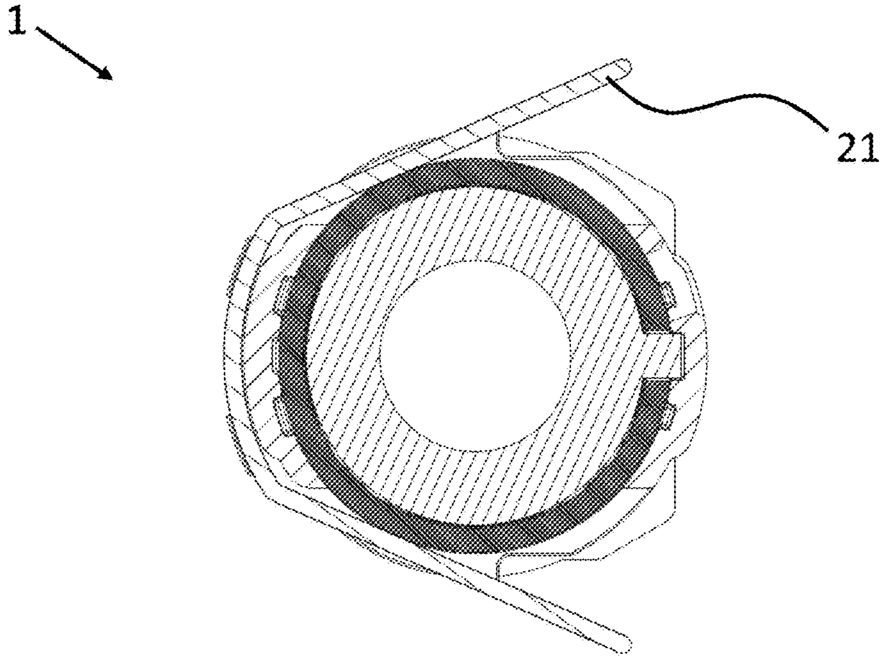
FIG. 25 illustrates a cross-section through the fluid coupling apparatus in a final assembly position.
Figure 27:
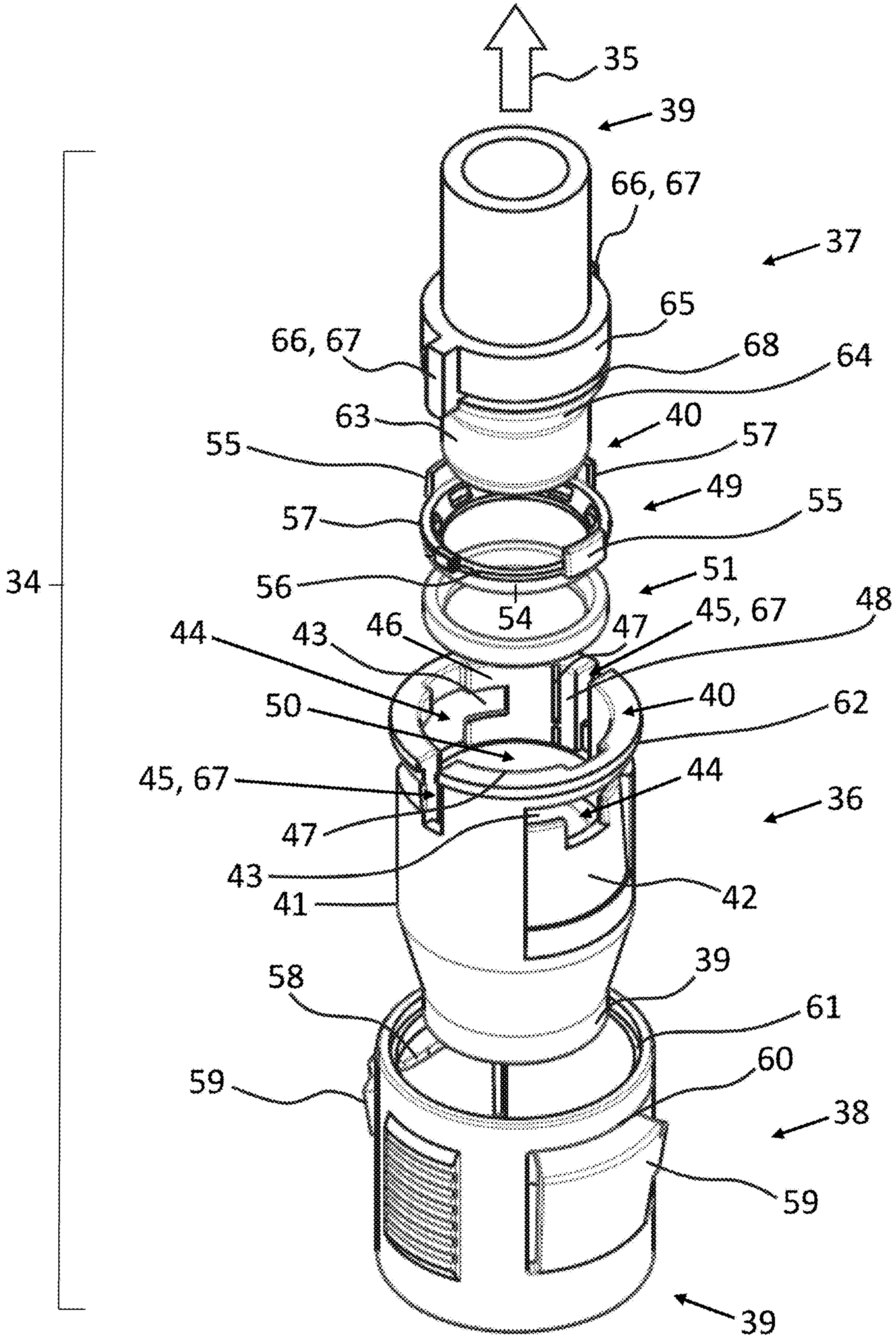
FIG. 27 illustrates a perspective exploded illustration of a fluid coupling apparatus according to the disclosure according to a third exemplary embodiment.

In the following, a fluid coupling apparatus 1 according to the disclosure is described in further detail according to a second exemplary embodiment (FIGS. 14 to 27). Unless otherwise described, the fluid coupling apparatus 1 according to the disclosure has the same technical features as the fluid coupling apparatus according to the second exemplary embodiment. Identical technical features bear the same reference numerals.

As explained above, an anti-rotation retaining device for the present disclosure according to the first two exemplary embodiments is not necessarily required, but merely optional, and this applies in particular to the protrusions 27 on the plug element 6. According to the first exemplary embodiment, the locking sleeve 11 can alternatively also be displaced in the axial direction by contacting the plug element. This will be explained in detail in the following for the second exemplary embodiment.

According to the second exemplary embodiment, an annular sealing element 8 is first arranged in the axial direction 2 in the receiving space 7. The sealing element 8 is positionally fixed by means of a retaining ring 9.

The retaining ring 9 is integrally connected to the socket element 5. For example, a sacrificial contour can be molded radially circumferentially onto the retaining ring 96 [sic: 9], so that the retaining ring 9 can be connected to the socket element 5 by means of ultrasonic welding. Other suitable connecting means, such as catching connections, are also additionally or alternatively possible.

In the retaining ring 9, radially circumferential and radially outwardly open locking recesses 10 are formed.

On the retaining ring 9 on the coupling side 4, first run-up slopes 31 are configured tangentially circumferential and equidistant from one another, extending in a cone shape on the inside in the axial direction 2. The conical flare extends in the axial direction a bit into the inner casing wall 14.

The locking recesses 10 are formed in these first run-up slopes on the outside, by contrast to the first exemplary embodiment.

Furthermore, a tubular locking sleeve 11 is arranged in the socket element 5. The locking sleeve 11 is displaceable in the axial direction 2 in the direction of the conduction side 3 of the socket element 5.

Two outer catching elements 13, which extend radially outward and are preferably diametrically opposite one another, are formed on an outer casing wall 12 of the locking sleeve 11.

Four inner catching elements 15 are molded on an inner casing wall 14 of the locking sleeve 11, being tangentially circumferential and preferably equally spaced from one another.

In addition, four second run-up slopes 32, which are also configured so as to widen conically in the axial direction 2, are configured tangentially circumferential and equidistant from one another on the inner casing wall 14.

The second run-up slopes 32 are arranged in the region between the first run-up slopes 31.

On a front-facing end portion of the locking sleeve 11, two anti-rotation retaining recesses 16, which are diametrically opposite one another, can optionally be formed on the coupling side.

The locking sleeve 11 is axially displaceably locked in a pre-assembly position 17 via the inner catching elements 15, which are arranged in the locking recesses 10 of the retaining ring 9.

Furthermore, the socket element 5 comprises two retaining recesses 18, which are diametrically opposite one another, which are preferably configured as passage openings.

Furthermore, the socket element 5 comprises two retaining element receiving slots 19 extending orthogonally to the axial direction 2.

The retaining ring 9 and the locking sleeve 11 can optionally comprise guide bars, which are received in correspondingly configured guide grooves in the socket element 5 in order to guide the retaining ring 9 and the locking sleeve 11 in the axial direction and/or to secure it against twisting around a longitudinal axis.

In addition, the fluid coupling apparatus 1 comprises a retaining element 20. The retaining element 20 is approximately C-shaped and has two retaining arms 21.

The retaining element 20 is preferably formed from metal, but can alternatively also be formed from plastic.

Anti-loss retaining elements 22 are molded onto free ends of the retaining arms 21 and are received in the pre-assembly position 17 in the anti-loss retaining recesses 23 formed in the retaining element slots 19.

In the pre-assembly position 17, the retaining arms 21 are bent in the radial direction outward and rest in grooves on the outer casing wall 9 of the locking sleeve 8 in this biased state.

In a final assembly position 24, the outer catching elements 13 of the locking sleeve 11 lock into the retaining recesses 18 of the socket element 5.

The plug element 6 first comprises on the coupling side a cylindrical section 25 with an insertion slope, which transitions in the axial direction 2 via a conical section 30 into a radially circumferential retaining groove 26 of the plug element 6.

Optionally but not preferably, two protrusions 27 which are diametrically opposite one another and extend radially outwards as well as in the axial direction 2 can be molded in the axial direction 2 adjacent to the radially circumferential retaining groove 26.

The receiving space 7 of the socket element 5 is correspondingly configured so as to approximately correspond to the outer contour of the plug element 6 and accordingly comprises two grooves 28 which are diametrically opposed and extend in the axial direction.

The plug element 6 can also be configured without corresponding protrusions 27.

The grooves 28 of the socket element 5, in conjunction with the protrusions 27 of the plug element 6, can form an anti-rotation retaining device 29 of the fluid coupling apparatus 1.

When coupled, the conical portion 30 of the plug element 6 first contacts the second run-up slopes 32 of the retaining ring 11 and displaces them in the direction of the socket element 5 until the conical portion also contacts the first run-up slopes. Together with the conical region of the inner casing wall 14 of the retaining ring 9 and the second run-up slopes 32 of the locking sleeve 11, the first run-up slopes 31 form a counter-cone configured so as to correspond to the conical section 30 of the plug element.

By contacting these cone-shaped regions, the locking sleeve 11 can be displaced up to the final assembly position 24.

Furthermore, according to the present disclosure, a method is provided for axially coupling two fluid lines to the fluid coupling apparatus 1 according to the present disclosure.

In the axial coupling, the socket element 5 and the plug element 6 are first moved or displaced in the axial direction 2 relative to one another. In this way, the conical portion 30 of the plug element 6 contacts the second run-up slopes of the locking sleeve 11 such that the locking sleeve 11 is displaced in the axial direction 2 in the direction of the conduction side of the socket element 5, thereby displacing the inner catching elements 15 of the locking sleeve 11 in the locking recesses 10 of the retaining ring 9 in the axial direction.

If present, the anti-rotation retaining recesses 16 of the locking sleeve 11 can contact the protrusions 27 of the plug element 6.

Through a further displacement of the locking sleeve 11 by means of the plug element 6, the outer catching elements 13 of the locking sleeve 11 finally lock into the retaining recesses 18 of the socket element 5 so that the retaining arms 21 of the retaining element 20 now move freely through the retaining element receiving slots 19 into the receiving space 7 and engage with the radially circumferential retaining groove 26 of the plug element 6.

In this way, the final assembly position 24 is securely and reliably fixed. The retaining arms 21 or the retaining element 20 are not only moved radially inward, but also orthogonally to the axial direction 2 in the direction of the receiving space 7.

In this way, a complete coupling of the socket element 5 and the plug element 6 is possible, and the final assembly position 24 is securely and reliably fixed.

In addition, the fluid coupling apparatus 1 can comprise a verification device 33 for detecting the final assembly position 21 in the form of a QR code or a data matrix code, which is arranged on the outside of the locking sleeve 11 and is completely readable only in the final assembly position by a window configured in the socket element 5.

For this purpose, an RFID tag is provided, having an RFID chip that is connected to an antenna via a line section. For example, the line section can extend in the axial direction transversely over one of the retaining element slots 16 so that the retaining element 20 or its retaining arms 21 do not touch the connection section.

The respective arm can be sharp-edged or can comprise a cutting means, for example, so that, upon the displacement of the retaining arms when achieving the final assembly position, the connection section between the RFID chip and the antenna is severed.

Accordingly, the RFID chip then no longer generates a signal, and the loss of this signal can be detected by a corresponding control device in the form of a detection signal in order to verify the end assembly position.

Alternatively, the line portion can also be interrupted in the pre-assembly position, wherein, upon achieving the final assembly position, the connection is established in order to generate a signal that is detectable as a detection signal.

Addition or alternatively, haptic and/or optical verification devices are also possible.

Figure 28:
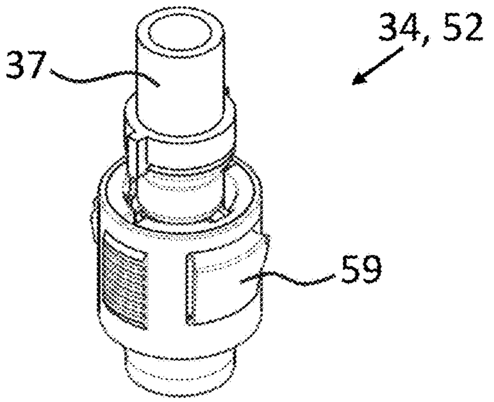
FIG. 28 illustrates a perspective illustration of the fluid coupling apparatus in a pre-assembly position.
Figure 29:
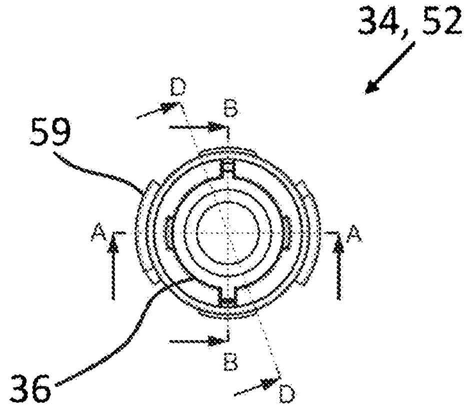
FIG. 29 illustrates an aerial view in the axial direction of the fluid coupling apparatus in the pre-assembly position.
Figure 30:
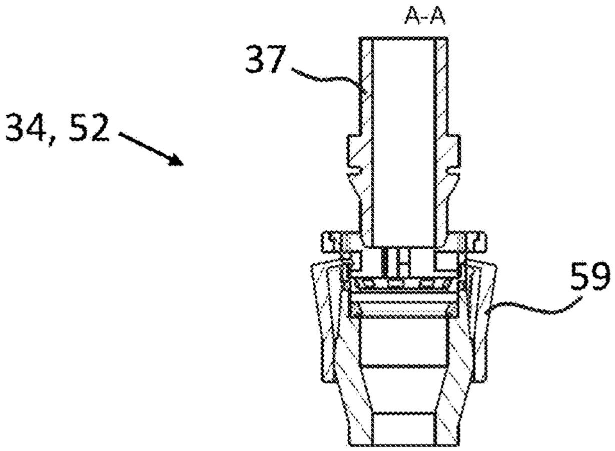
FIG. 30 illustrates a side-cut illustration of the fluid coupling apparatus, cut along line A-A in the pre-assembly position.
Figure 31:
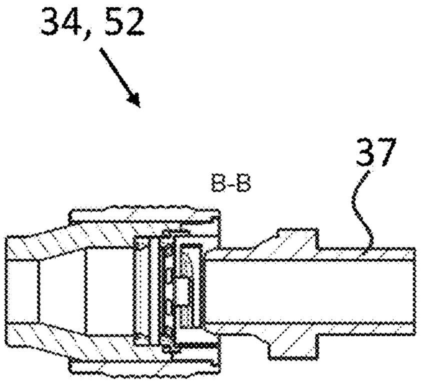
FIG. 31 illustrates a side-cut illustration of the fluid coupling apparatus, cut along line B-B in the pre-assembly position.
Figure 32:
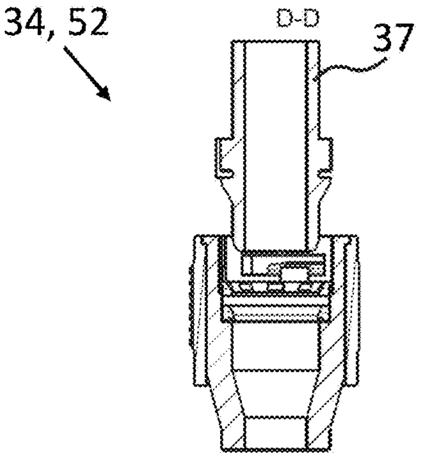
FIG. 32 illustrates a side-cut cross-sectional illustration of the fluid coupling apparatus, cut along line D-D in the pre-assembly position.
Figure 33:
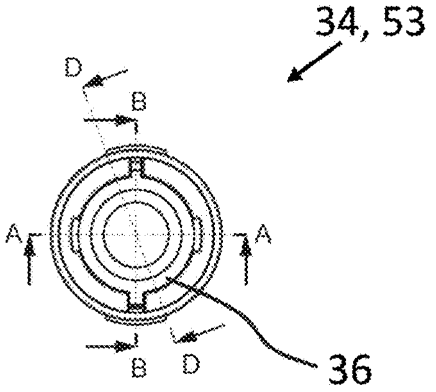
FIG. 33 illustrates an aerial view in the axial direction of the fluid coupling apparatus in the final assembly position.
Figure 34:
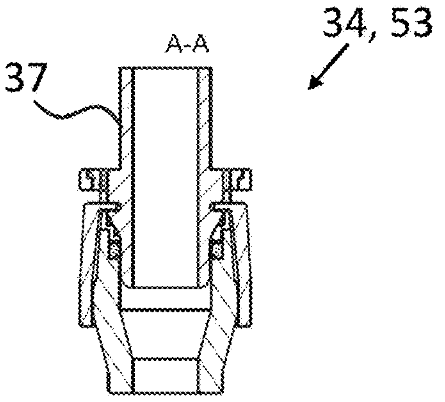
FIG. 34 illustrates a side-cut illustration of the fluid coupling apparatus, cut along line A-A in the final assembly position.
Figure 35:
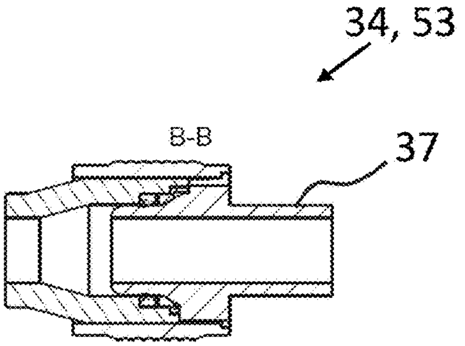
FIG. 35 illustrates a side-cut illustration of the fluid coupling apparatus, cut along line B-B in the final assembly position.
Figure 36:
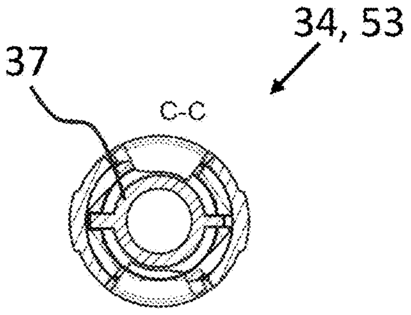
FIG. 36 illustrates a cut, cross-sectional illustration of the fluid coupling apparatus, cut along line C-C in the final assembly position.
Figure 37:
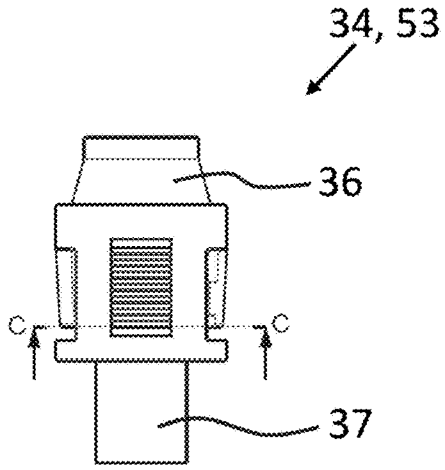
FIG. 37 illustrates a side view of the fluid coupling apparatus in the final assembly position.
Figure 38:
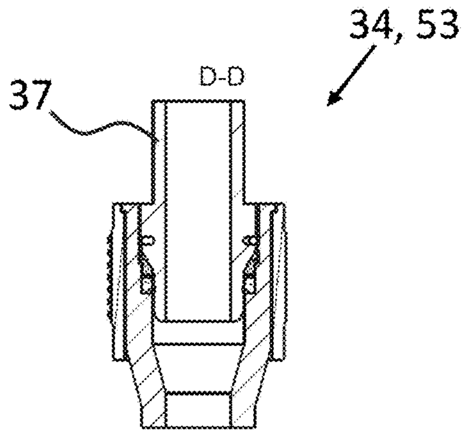
FIG. 38 illustrates a side-cut illustration of the fluid coupling apparatus, cut along line B-B in the final assembly position.

According to a further aspect, according to the present disclosure, a fluid coupling apparatus 34 is provided for axially coupling two fluid lines (not shown) in an axial direction 35 (FIGS. 27-38).

The fluid coupling apparatus 34 comprises a tubular socket element 36, a tubular plug element 37, and a sleeve-like retaining element 38.

The socket element 36 and the plug element 37 each have a conduction side 39 and a coupling side 40.

In an outer casing wall 41 of the socket element 36, two catching element receiving recesses 42, which are diametrically opposite one another, are formed.

The catching element receiving recesses 42 taper in the direction of the coupling side 40 of the socket element 36 in an approximately conical manner.

On a coupling-side end of the catching element receiving recesses 42, a respective catching element passage opening 43 extending orthogonally to the axial direction 35 is configured.

The catching element passage opening 43 opens on the conduction side into a locking recess 44.

Furthermore, two grooves 45 that are diametrically opposed and extend in the axial direction 35 are formed in the socket element 36.

In addition, two holding grooves 47 which are diametrically opposite and extend in the axial direction 35 are formed on an inner casing wall 46. In the holding grooves 47, a holding body 48 for limiting a displacement of a locking sleeve 49 in the direction of the coupling side 40 of the socket element 36 is arranged.

The socket element 36 limits a receiving space 50 for receiving the plug element 37.

An annular sealing device 51 is arranged in the receiving space 50. The sealing device 51 is held in a loss-proof manner in a pre-assembly position 52 by means of the axially displaceable locking sleeve 49 and positionally fixed in a final assembly position 53.

Two locking elements 55, which are diametrically opposite one another, are molded onto the outer side of the locking sleeve 49 and on an outer casing wall 54, respectively.

Furthermore, two holding elements 56 diametrically opposite one another are molded onto the outer casing wall 54 of the locking sleeve 49.

Two anti-rotation retaining portions 57, which are diametrically opposite one another, are also molded onto the outer casing wall 54 of the locking sleeve 49.

The holding elements 56 of the locking sleeve 49 are received in the holding grooves 47 of the socket element 36, wherein a displacement of the locking sleeve 49 in the axial direction 35 in the direction of the coupling side 40 of the socket element 36 is limited by the abutment of the holding elements 56 on the holding bodies 48.

In the pre-assembly position 52, the locking elements 55 of the locking sleeve 49 are arranged in the locking recesses 44 of the socket element 36 in order to ensure axial guidance of the locking sleeve 49 in the axial direction 35.

In the region of the catching element receiving recesses 42, threaded portion-like disassembly grooves 58 are provided on the outer casing wall 41 of the socket element 36.

Furthermore, the socket-like or tubular-shaped retaining element 38 is arranged on the socket element 36.

Two diametrically opposed and radially inwardly extending catching elements 59 are formed on the retaining element 38, with corresponding catching edges 60. The catching edges 60 extend orthogonally to the axial direction 35.

Furthermore, the retaining element 38 can comprise an inside radially circumferential coupling-side end stop 61, which, when the final assembly position 53 is achieved, abuts a corresponding counter-contour 62 of the socket element 36.

The plug element 37 comprises a cylindrical portion 63 which transitions into a conically flaring portion 64.

Furthermore, on the plug element 37 or on an outer casing wall 65 of the plug element 37, two diametrically opposed protrusions 66 are molded, extending in the axial direction 35 and in the radial direction outwardly.

These protrusions 66 are received in the grooves 45 formed on the inner casing wall 46 of the socket element 36 and, together with these, form a groove-like/spring-like anti-rotation retaining device 67 for axially guiding a relative movement between the socket element 36 and the plug element 37.

In addition, a radially circumferential retaining groove 68 is configured on the outer casing wall 65 of the plug element 37, in which the catching edges 60 of the catching elements 59 and catching arm can be received and arranged.

Furthermore, according to the present disclosure, a method is provided for axially coupling two fluid lines to a fluid coupling apparatus 34 according to the present disclosure.

It is provided that a tubular plug element 37 is introduced into a receiving space 50 of a tubular socket element 36 in the axial direction 35.

A coupling-side end of the plug element 37 contacts a locking sleeve 49, which is arranged in an axially displaceable manner in the socket element 36.

Due to this movement, locking elements 55 of the locking sleeve 49, which apply a radially outward acting force upon catching elements 59 of a retaining element 38, are disengaged from corresponding locking recesses 44 of the socket element 36.

In this way, the catching elements 59 are released such that their catching edges 60 engage with a radially circumferential retaining groove 68 of the plug element 37.

It can also be provided that the locking sleeve 49 is fixed in the socket element 36 by means of a catching device (not shown) upon achieving a final assembly position 53.

In addition, the fluid coupling apparatus 34 can comprise a verification device (not shown) for detecting the final assembly position 53.

For this purpose, in particular, an RFID tag is provided, having an RFID chip that is connected to an antenna via a line section. For example, the line section can extend in the axial direction 35 transversely over a retaining groove 68 so that the retaining element 38, or catching edges 60 on the catching elements 59 of the retaining element 38, do not touch the line section.

For example, the catching edges 60 can be sharp-edged or can comprise a cutting means, so that, upon the displacement of the catching edges 60 when achieving the final assembly position 53, the line section between the RFID chip and the antenna is severed.

Accordingly, the RFID chip then no longer generates a signal, and the loss of this signal can be detected by a corresponding control device in the form of a detection signal in order to verify the end assembly position 53.

Alternatively, the line portion can also be interrupted in the pre-assembly position 52, wherein, upon achieving the final assembly position 53, the connection is established in order to generate a signal that is detectable as a detection signal.

Addition or alternatively, haptic and/or optical verification devices are also possible.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Fluid coupling apparatus
2 Axial direction
3 Conduction side
4 Coupling side
5 Socket element
6 Plug element
7 Receiving space
8 Sealing element
9 Retaining ring
10 Locking recess
11 Locking sleeve
12 Outer casing wall
13 Outer catching elements
14 Inner casing wall
15 Inner locking elements
16 Anti-rotation retaining recesses
17 Pre-assembly position
18 Retaining recess
19 Retaining element receiving slot
20 Retaining element
21 Retaining arm
22 Anti-loss retaining element
23 Anti-loss retaining recess
24 Final assembly position
25 Cylindrical portion
26 Retaining groove
27 Protrusion
28 Groove
29 Anti-rotation retaining device
30 Conical portion
31 First run-up slope
32 Second run-up slope
33 Verification device
34 Fluid coupling apparatus
35 Axial direction
36 Socket element
37 Plug element
38 Retaining element
39 Conduction side
40 Coupling side
41 Outer casing wall
42 Catching element receiving recess
43 Catching element passage opening
44 Locking recess
45 Groove
46 Inner casing wall
47 Holding groove
48 Holding body
49 Locking sleeve
50 Receiving space
51 Sealing device
52 Pre-assembly position
53 Final assembly position
54 Outer casing wall
55 Locking element
56 Holding element
57 Anti-rotation retaining portion
58 Disassembly groove
59 Catching element
60 Catching edge
61 End stop
62 Counter-contour
63 Cylindrical portion
64 Conical portion
65 Outer casing wall
66 Protrusion
67 Anti-rotation retaining device
68 Retaining groove

What is claimed is:

1. A fluid coupling apparatus for coupling two fluid lines along an axial direction, the fluid coupling apparatus comprising:

a retaining ring;

a tubular socket element having at least one slot, a conduction side, and a coupling side, wherein a locking sleeve which is axially displaceable in a direction of the conduction side is arranged in the socket element and fixes a pre-assembly position, wherein a plurality of retaining recesses are formed in the tubular socket element, wherein the retaining ring comprises at least one locking recess, and wherein the locking sleeve includes at least one inner catching element for fixing the pre-assembly position, which extends radially inward and is arranged in the locking recess in the pre-assembly position, and at least one outer catching element for fixing the locking sleeve in a final assembly position, which extends radially outward and is arranged in the locking recess in the final assembly position;

a tubular plug element having a conduction side and a coupling side and a retaining groove, wherein a retaining groove is formed on an outside of the tubular plug element; and a retaining element configured to enter the at least one slot, wherein the retaining element is arranged orthogonally to the axial direction and is C-shaped and has two retaining arms.

2. The fluid coupling apparatus according to claim 1, wherein the at least one inner catching element extends radially inward and is arranged in the locking recess in the pre-assembly position.

3. The fluid coupling apparatus according to claim 1, wherein the at least one outer catching element extends radially outward and is arranged in the locking recess in the final assembly position.

4. The fluid coupling apparatus according to claim 1, wherein the socket element comprises a second slot, the at least one slot and second slot extending orthogonally to an axial direction and arranged opposite one another are formed in the socket element.

5. The fluid coupling apparatus according to claim 4, wherein the retaining groove extends orthogonally to the axial direction, in which, in a final assembly position, retaining arms of the retaining element are receivable.

6. The fluid coupling apparatus according to claim 1, wherein the two retaining arms are arranged in the at least one slot in the pre-assembly position and abut an outer casing wall of the locking sleeve in a biased manner, wherein the at least one slot extends through a wall of the socket element such that the retaining arms within the slot contact the outer casing wall of the locking sleeve disposed within the socket element.

7. The fluid coupling apparatus according to claim 1, wherein the retaining arms are received in the retaining groove in the final assembly position after release by the locking sleeve and thereby fix a complete coupling of the socket element and the plug element in the final assembly position.

8. A fluid coupling apparatus for coupling two fluid lines, the fluid coupling apparatus comprising:

a retaining ring;

a tubular socket element having a conduction side and a coupling side, wherein a locking sleeve which is axially displaceable in a direction of the conduction side is arranged in the socket element and fixes a pre-assembly position, wherein a plurality of retaining recesses are formed in the tubular socket element, wherein the retaining ring comprises at least one locking recess, and wherein the locking sleeve comprises at least one inner catching element for fixing the pre-assembly position, which extends radially inward and is arranged in the locking recess in the pre-assembly position, and at least one outer catching element for fixing the locking sleeve in a final assembly position, which extends radially outward, wherein the at least one outer catching element is arranged in the locking recess in the final assembly position, wherein two retaining element slots extending orthogonally to an axial direction and arranged opposite one another are formed in the socket element;

a tubular plug element having a conduction side and a coupling side and a retaining groove, wherein on the tubular plug element on an outside, the retaining groove is formed extending orthogonally to the axial direction, in which, in a final assembly position, retaining arms of a retaining element are receivable; and the retaining element is biased in the pre-assembly position and releasable by displacing the locking sleeve by means of the plug element in the direction of the conduction side of the socket element such that the retaining element is received in a final assembly position in the retaining groove and thereby a complete coupling of the socket element and the plug element is fixed in the final assembly position, wherein the retaining element is arranged orthogonally to the axial direction and is C-shaped and has two retaining arms, which are arranged in the retaining slots, wherein, in the pre-assembly position, the retaining arms abut an outer casing wall of the locking sleeve in a biased manner, and wherein the retaining arms are received in the retaining groove in the final assembly position after release by the locking sleeve and thereby fix a complete coupling of the socket element and the plug element in the final assembly position.

9. The fluid coupling apparatus according to claim 8, wherein a sealing element is arranged on the conduction side in the socket element and is positionally fixed in a region of the coupling side by means of a retaining ring, wherein the at least one locking recess is configured in the retaining ring in order to receive one of the at least one inner catching elements of the locking sleeve.

10. The fluid coupling apparatus according to claim 9, wherein the retaining ring is firmly connected to the socket element.

11. The fluid coupling apparatus according to claim 8, wherein at free ends of the retaining arms of the retaining element, anti-loss retaining elements are arranged, which are arranged in the pre-assembly position in the anti-loss retaining recesses formed in the retaining element slots.

12. The fluid coupling apparatus according to claim 8, wherein the fluid coupling apparatus comprises a groove-like or spring-like anti-rotation retaining device for axially guiding a relative movement between the socket element and the plug element, wherein on an outer casing wall of the plug element, two diametrically opposed protrusions are molded, extending in the axial direction and in the radial direction outwardly, wherein on an inner casing wall of the socket element, two grooves are formed so as to correspond to the two diametrically opposed protrusions and extending in the axial direction, in which the two diametrically opposed protrusions are received, and wherein two anti-rotation retaining recesses are formed in the locking sleeve on the connection side and are arranged diametrically opposite one another, in which portions of the two diametrically opposed protrusions of the plug element are received.

13. The fluid coupling apparatus according to claim 8, wherein two radially circumferential retaining recesses are arranged in the socket element.

14. The fluid coupling apparatus according to claim 8, wherein two radially circumferential locking recesses are arranged in the retaining ring.

15. The fluid coupling apparatus according to claim 8, wherein two radially circumferential inner catching elements extending radially inwardly are molded onto the locking sleeve.

16. The fluid coupling apparatus according to claim 8, wherein two radially circumferential outer catching elements extending radially outward are molded onto the locking sleeve.

17. A method for axially coupling two fluid lines to a fluid coupling apparatus, the fluid coupling apparatus comprising a tubular socket element having at least one slot, a conduction side, and a coupling side, wherein a locking sleeve which is axially displaceable in a direction of the conduction side is arranged in the socket element and fixes a pre-assembly position, wherein the locking sleeve includes at least one inner catching element for fixing the pre-assembly position, wherein the at least one inner catching element extends radially inward and is arranged in a locking recess in the pre-assembly position, and at least one outer catching element for fixing the locking sleeve in a final assembly position, wherein the at least one outer catching element extends radially outward and is arranged in the locking recess in the final assembly position; a tubular plug element having a conduction side and a coupling side and a retaining groove, wherein a retaining groove is formed on an outside of the tubular plug element; and a retaining element configured to enter the at least one slot, wherein the retaining element is arranged orthogonally to the axial direction and is C-shaped and has two retaining arms; the method comprising the following steps:

introducing the tubular plug element in the axial direction into tubular socket element;

displacing the locking sleeve of the socket element in the direction of the conduction side of the socket element by means of the plug element;

disengaging the at least one inner catching element of the locking sleeve from locking recess with which the pre-assembly position has been fixed;

locking the at least one outer catching element in a retaining recess of the socket element;

releasing a biased retaining element by the displacement of the locking sleeve;

moving retaining arms of the retaining element radially inward and orthogonal to an axial direction in the direction of the socket element and the plug element, and inserting the retaining arms through a receiving slot of the socket element into the retaining groove of the plug element; and fixing the socket element and the plug element in a completely coupled final assembly position.

18. The method according to claim 17, further comprising the following step:

linearly guiding a relative movement in the axial direction between the socket element, the locking sleeve of the socket element, and the plug element via an anti-rotation retaining device.

* * * * *